(No Model.)

J. P. BROWNING.
AUXILIARY LINK FOR BICYCLE DRIVE CHAINS.

No. 592,275. Patented Oct. 26, 1897.

Witnesses
H. S. Young
H. Dennison

Inventor:
J. P. Browning
by
Fetherstonhaugh & Co
attys

UNITED STATES PATENT OFFICE.

JOHN PEDDIE BROWNING, OF BRANTFORD, CANADA, ASSIGNOR OF TWO-THIRDS TO ALEXANDER DAVID HARDY AND FREDERICK G. FAWKES, OF SAME PLACE.

AUXILIARY LINK FOR BICYCLE DRIVE-CHAINS.

SPECIFICATION forming part of Letters Patent No. 592,275, dated October 26, 1897.

Application filed November 12, 1896. Serial No. 611,853. (No model.)

*To all whom it may concern:*

Be it known that I, JOHN PEDDIE BROWNING, manufacturer's agent, residing at the city of Brantford, in the county of Brant, in the Province of Ontario, Canada, have invented certain new and useful Improvements in Auxiliary Links for Bicycle Drive-Chains, of which the following is a specification.

My invention relates to improvements in auxiliary links for bicycle drive-chains; and the object of the invention is to design a link which may be adopted, should the chain become broken, to connect the broken links of the chain and thereby form a temporary link in order to enable the rider of the bicycle to reach his destination and get the chain repaired at his leisure; and it consists, essentially, of a peculiarly-formed yoke which is connected together at the outer ends by a suitable bar or other form of connection, the inner end of the said auxiliary link being designed to fit the inner side of the solid link, as hereinafter more particularly explained.

Figure 1:
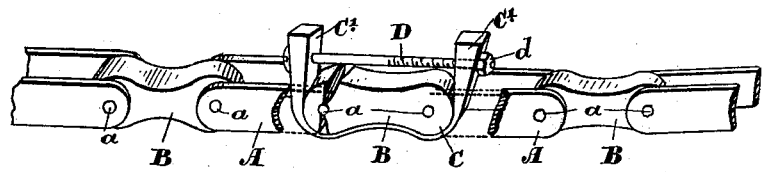
Figure 2:
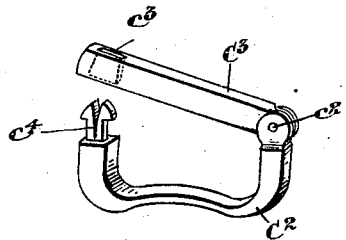
Figure 3:
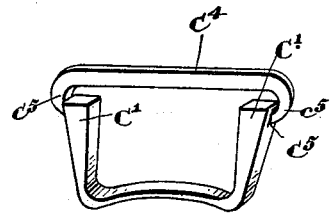
Figure 4:
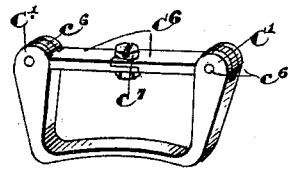
Figure 5:
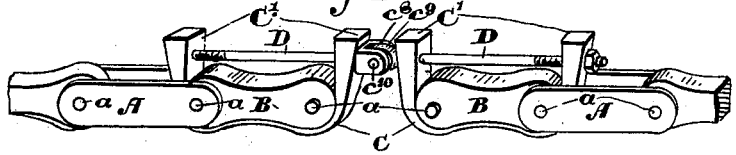

Figure 1 is a perspective view of portion of a sprocket-chain, showing a break in the solid link where the pin of the double link passes through it. Figs. 2, 3, and 4 are details of alternative forms of auxiliary links. Fig. 5 is a view of portion of a sprocket-chain and two auxiliary links joined together in order to connect the broken chain when the break is made in a double link.

In the drawings like letters of reference indicate corresponding parts in each figure.

A are the double links of the chain, and B are the solid links, and $a$ are the pins which extend through the ends of the double links and the ends of the solid links to connect the links of the chain together. The solid links in most chains are formed concaved longitudinally inside and outside, as indicated.

C is the U-shaped portion or yoke of the auxiliary link, which is substantially broad U-shaped in form longitudinally and fits the inner side and the ends of the link, as shown. The outer free ends C' of the U-shaped portion or yoke of the auxiliary link are preferably made thicker than the base of the link, which is made thin, so as to make practically no difference in the total width of the link, as it fits between the teeth of the sprocket-chain.

D is a bolt which extends through the outer ends C' and has a nut $d$ secured on its threaded end outside the one end C', as shown. The bolt D serves to brace the outer ends C' together. As the pin fitting through the broken portion of the solid link and the corresponding end of the double link is encompassed by the U-shaped portion or yoke of the auxiliary link, it will be seen that such auxiliary link will serve to hold securely together the two double links connected to the solid link broken, and I find in practice that such auxiliary link is very effective for the purpose for which it is designed—viz., to form a temporary repair of the chain until the rider of the bicycle can reach his destination, when of course he may have a new link inserted by expert mechanics, and not have to walk, as is now frequently the case where the chain becomes broken on the road.

The auxiliary link, of course, it will be understood, might form part of the equipment of every bicyclist.

In Fig. 2 I show the yoke $C^2$ of the auxiliary link with a bar $C^3$ pivoted between the jaws $c^2$ at one outer end of the yoke. The other end of the bar $C^3$ has a slot $c^3$ formed in it, which is designed to fit over a spring-catch $c^4$, formed at the outer end of the other side of the yoke of the auxiliary link. Instead of the catch $c^4$ a threaded stem might be provided at the upper end of this portion of the link and fit in a corresponding hole in the bar $C^3$ and be provided with a nut on the top of it.

In Fig. 3 I show the yoke of the link connected together by a bar $C^4$, having curved gripping ends $c^5$, which extend into recesses $C^5$ made in the sides of the outer ends of the U-shaped portion or yoke of the link.

In Fig. 4 I show still another alternative form in which the connecting-bar for the ends of the U-shaped portion or yoke of the auxiliary link is formed in two parts $C^6$, which are pivoted in jaws $c^6$ at the outer ends of the U-shaped portion or yoke of the link. The centers of the bars are fitted together as shown and are connected by any suitable form of screw or connection $C^7$.

In Fig. 5 I show two auxiliary links, which would require to be used should the double link of the chain become broken. The broken ends in this case, of course, would be wrenched off, and the ends of the bolts would have heads on them, one in the shape of a jaw $c^8$, into which the flat head $c^9$ of the other bolt would extend and be hinged therein by a pin $c^{10}$. This latter form will effectually serve to join the broken chain where a double link has been broken.

Although I show three alternative forms, it will of course be understood that several equivalent or simple forms might be devised which might accomplish the object which I have in view—that is, to form an auxiliary link which will effectually connect a broken chain temporarily when required.

What I claim as my invention is—

1. An auxiliary link for sprocket-chains comprising a flat yoke having a convex central portion adapted to snugly fit the concave part of a solid link, and concave portions forming continuations of said convex portion each end portion of said link extending at right angles to said central portion, and means for detachably connecting said ends, substantially as described.

2. An auxiliary link comprising a thinned yoke having a central convex portion and concave portions forming continuations thereof, the end portions thereof extending substantially at right angles to said central portion and tapering from said concave portions outwardly toward their ends, and the detachable connection between said ends, substantially as described.

3. As auxiliary links for joining broken and disconnected links in a bicycle-chain, two U-shaped yokes adapted to fit snugly around the inner sides and ends of the adjacent disconnected links, a connecting device extending between the outer ends of each U-shaped yoke and a flexible connection between the auxiliary links as and for the purpose specified.

4. As auxiliary links for joining broken and disconnected links in a bicycle-chain, two U-shaped yokes adapted to fit snugly around the inner sides and ends of the adjacent disconnected links, bolts extending through the outer ends of the U-shaped yokes, a jaw-head on the end of one bolt and a flat head on the end of the opposite bolt between the auxiliary links and a pin extending through the jaw-head and flat head to form a hinge as and for the purpose specified.

JOHN PEDDIE BROWNING.

Witnesses:
B. BOYD,
H. DENNISON.